US007181422B1

(12) United States Patent
Philip et al.

(10) Patent No.: US 7,181,422 B1
(45) Date of Patent: Feb. 20, 2007

(54) SEGREGATION AND MANAGEMENT OF FINANCIAL ASSETS BY RULES

(75) Inventors: Karun Philip, New York, NY (US); Harpal Maini, New York, NY (US)

(73) Assignee: Tranquilmoney, Inc., New York, NY (US)

( * ) Notice: Subject to any disclaimer, the term of this patent is extended or adjusted under 35 U.S.C. 154(b) by 867 days.

(21) Appl. No.: 09/693,568

(22) Filed: Oct. 20, 2000

(51) Int. Cl.
*G06Q 40/00* (2006.01)

(52) U.S. Cl. .................................. 705/36 R; 705/35

(58) Field of Classification Search ........ 705/35–36 R, 705/36; 706/56; 707/103 R; 715/763; 716/11
See application file for complete search history.

(56) References Cited

U.S. PATENT DOCUMENTS

| | | | | |
|---|---|---|---|---|
| 4,884,217 | A * | 11/1989 | Skeirik et al. ................. | 706/56 |
| 5,550,734 | A | 8/1996 | Tarter et al. ................. | 364/401 |
| 5,630,127 | A | 5/1997 | Moore et al. | |
| 5,704,044 | A | 12/1997 | Tarter et al. ................. | 395/204 |
| 5,710,894 | A * | 1/1998 | Maulsby et al. ............ | 715/763 |
| 5,920,870 | A * | 7/1999 | Briscoe et al. .......... | 707/103 R |
| 6,070,151 | A | 5/2000 | Frankel | |
| 6,073,104 | A * | 6/2000 | Field ............................ | 705/1 |
| 6,167,384 | A | 12/2000 | Graff .......................... | 705/35 |
| 6,192,347 | B1 * | 2/2001 | Graff ........................ | 705/36 R |
| 6,233,566 | B1 | 5/2001 | Levine et al. | |
| 6,363,393 | B1 | 3/2002 | Ribitzky | |
| 6,430,733 | B1 * | 8/2002 | Cohn et al. ................. | 716/11 |
| 6,513,020 | B1 | 1/2003 | Weiss et al. | |
| 6,856,970 | B1 * | 2/2005 | Campbell et al. ............. | 705/35 |

FOREIGN PATENT DOCUMENTS

JP   363220370 A   *   9/1988
JP   408251163 A   *   9/1996

OTHER PUBLICATIONS

Chen et al "Data Mining: An Overview from a Database Perspective", Knowledge and Data Engineering, IEEE Transactions, Dec. 1996, vol. 8, Issue 6 pp. 866-883.*
Dhar et al "Abstract- driven Pattern Discovery in Databases", Knowledge and Data Engineering, IEEE Transactions, Dec. 1993, vol. 5, Issue 6 pp. 926-938.*

* cited by examiner

*Primary Examiner*—Hani M. Kazimi
*Assistant Examiner*—Narayanswamy Subramanian
(74) *Attorney, Agent, or Firm*—Fish & Richardson P.C.

(57) ABSTRACT

The invention supports the management of financial assets such as accounts receivable or mortgages. The invention provides a facility for a user to define rules to segregate assets into pools, define purchasing rules, capture real time information regarding transactions, reconcile payments and produce exception reports, define access rules for individual users to see information relating to pools of assets and individual assets within a pool, and provide customized reports and access to asset details over a network. Abstract representations of financial assets are used to obtain instances of defined financial-asset object classes to define pools of financial assets with common abstract characteristics. The invention uses a tree structured representation of asset classes for allocation of transactions to tranches and sub-tranches of assets within a pool. A user may define custom tranches and sub-tranches, as well as design pools of assets to an investment rating specification in advance.

24 Claims, 14 Drawing Sheets

Example Tranche Tree tranquil money.com

Home

Reports

Manage Securities
Manage Assets
Manage Originators
Manage Reports
Manage Payments
Manage Tranches Daily Transactions Manage User Access Please Specify The Rule For Securitization Of Receivables.

IF ...
Fields: NABP — 180
= — 182
12345 — 184
Add ● And — 186

Fields: SignUpDate
<
3/01/00
Add ○ Or

Rule:
(NABP = 12345)
AND
(SignUpDate < 03/01/00) — 188

[...] Clear

THEN ...
Prefunding Amount: ClaimAmount — 191  1.0 — 190
Fee: PreFundAmount — 193  0.01 — 192
With Recourse: ○ Yes ● No — 194

SEGREGATION AND MANAGEMENT OF FINANCIAL ASSETS BY RULES

This invention relates to managing financial assets using abstraction rules to segregate the assets into asset classes.

Securitization of financial assets is used by financial institutions to sell interests in pools of financial assets. A financial asset can be any promise of a future flow of money. Rather than sell the individual underlying assets (e.g. the loan or account receivable) the risk of an individual asset going bad is spread by selling interests in a pool of assets. An interest in the pool can be a percentage interest in the entire pool, or in specified portions or aspects of the pool, called tranches. An interest (also called a security) may be in the form of shares of stock, limited partnership units or other forms. The interest is typically called an asset-backed security, and the process of pooling the financial assets and selling interests in the pool is called securitization.

Securitization involves a number of parties including a lender (meaning a person or entity to whom a flow of money is to be paid), a borrower (a person or entity who will pay), and an investment bank which purchases pools of financial assets. Securitization can also include a rating agency that evaluates the various interests offered in the pool of financial assets, and investors who purchase interests in the pool of financial assets. Securitization involves a special-purpose vehicle that includes a legal entity such as a corporation set up to own the pool of financial assets, and a trustee that operates on behalf of the investors overseeing the operation of the special-purpose entity.

Interests in selected portions or tranches of the pool may be sold. Tranches represent a defined and limited aspect of the assets within the pool. For example, one tranche of a pool of loans might be the payments of principal only (a PO tranche), and another tranche the payments of interest only (called an IO tranche). Other tranches of an asset pool might include a hierarchy of risk, e.g., payments received would be first applied to the most senior tranche and then downward in order of seniority, and losses applied first to the most junior tranche and then upwards in reverse order of seniority. Yet another tranche might be a range of interest rates paid within a pool of loans.

Each tranche is eventually priced by investors (frequently with the aid of investment rating agencies) based upon perceived risk and rate of return.

Mortgage loans have historically lent themselves to securitization because each loan is typically well documented, provides for a regular stream of payments, and has a relatively long life. Purchasers of interests in a pool of mortgage loans can review the individual assets' documentation. Other forms of financial obligations, such as accounts receivable, have not lent themselves as well to the securitization process as have mortgage loans.

SUMMARY OF THE INVENTION

The present invention is a system, a method and a computer program product which receives information related to financial assets, stores the information and segregates assets based upon rules.

In another aspect, the invention manages accounts receivable, such as those generated at a retail pharmacy when filling prescriptions for an insured patient. In another aspect, information about the account receivable as it is generated is received by the invention in real time during an adjudication process wherein a pharmacy verifies with an insurer that a patient has coverage and the insurer agrees to pay the claim less the co-payment amount.

In yet another aspect, the invention reconciles payments received with the associated account receivable, and where this cannot be done, generates an exception report.

In another aspect, hard copy documents related to a financial asset such as an account receivable are scanned and an images stored for retrieval and display on request by an authorized user.

In yet another aspect, the invention supplies reports in summary or detail regarding financial assets, access to the information being limited in accordance with rules established by a user.

In yet another aspect, payments and other transactions regarding a financial asset are allocated in accordance with a tree representation of assets in accordance with abstraction rules.

In another aspect, the invention provides for reporting and asset pool definition to a user at a client connected to a server on a network, such as a local area network or the Internet.

Among the advantages of the invention are one or more of the following.

Financial assets may be aggregated in accordance with abstraction rules, and put into pools of assets. These pools can then be securitized and interests in the pools sold to investors. Investors can define the characteristics of assets in which they are willing to invest in accordance with rules defined by the investors. Because information regarding the financial assets is available over a network such as the Internet, and information regarding the financial assets can be gathered in real time, asset classes such as short-term receivables may easily be securitized.

Investors may obtain reports at will on classes of assets in which they are investing in accordance with rules defined by the seller of interests in a pool of assets. Investors can customize these reports, and obtain summary information and even detailed individual asset information. This aspect eases the process of keeping watch over investments, as does the ability to verify underlying documents evidencing financial assets by reviewing scanned images of these documents.

Management of financial assets, such as accounts receivable, is automated through the reconciliation process. As payments are received, they may be reconciled with the associated financial asset. Orphan payments that cannot be matched are thus easily identified, as are payments that do not match with the amount due, and an exception report automatically generated. Exception reports can be summarized by originator so as to ease the task of resolving exceptions.

DESCRIPTION OF DRAWINGS

Brief Description of the Drawings

Figure 1:
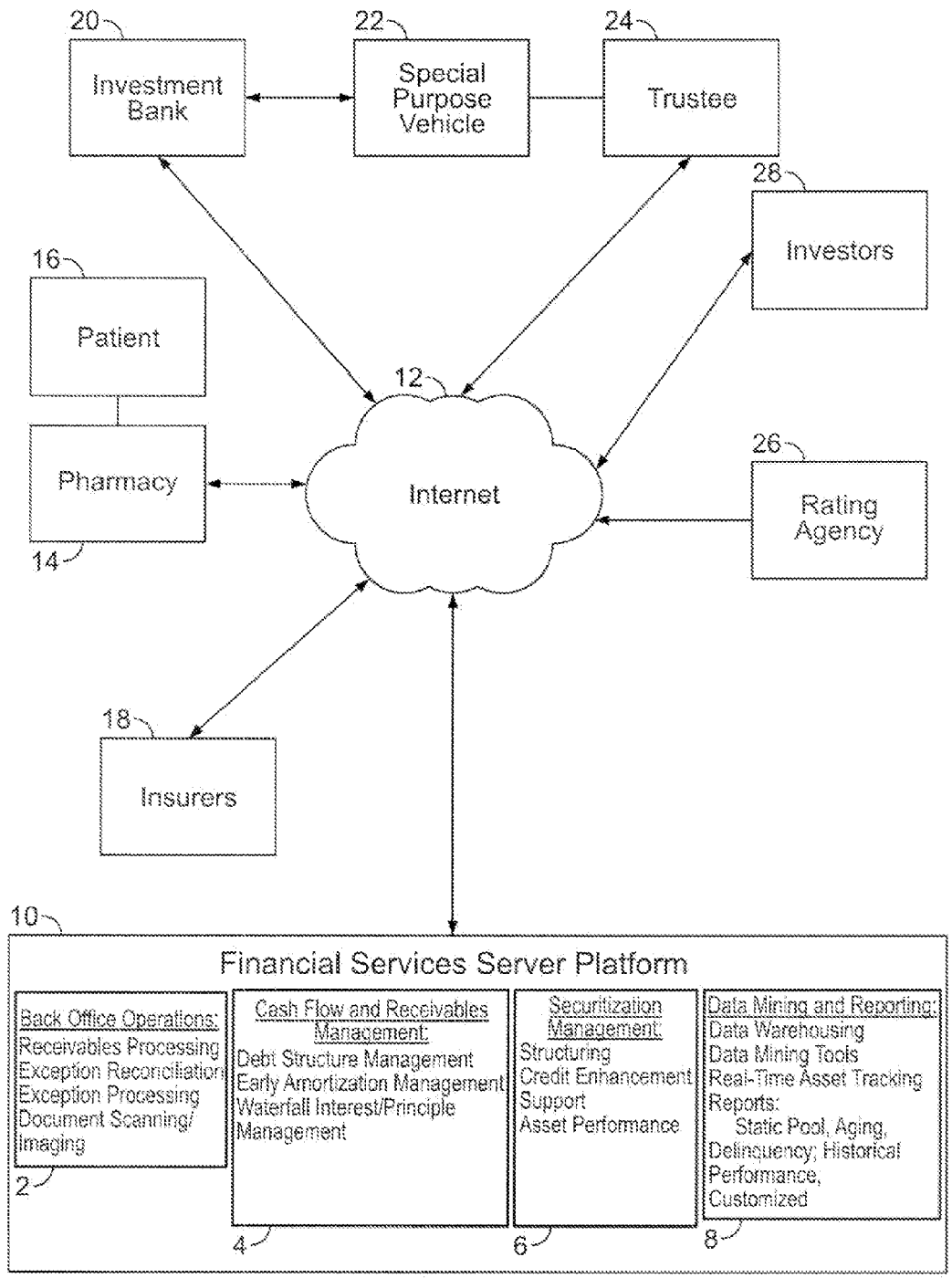

FIG. 1 is a block diagram showing a financial services platform and entities involved in the securitization process.

Figure 2:
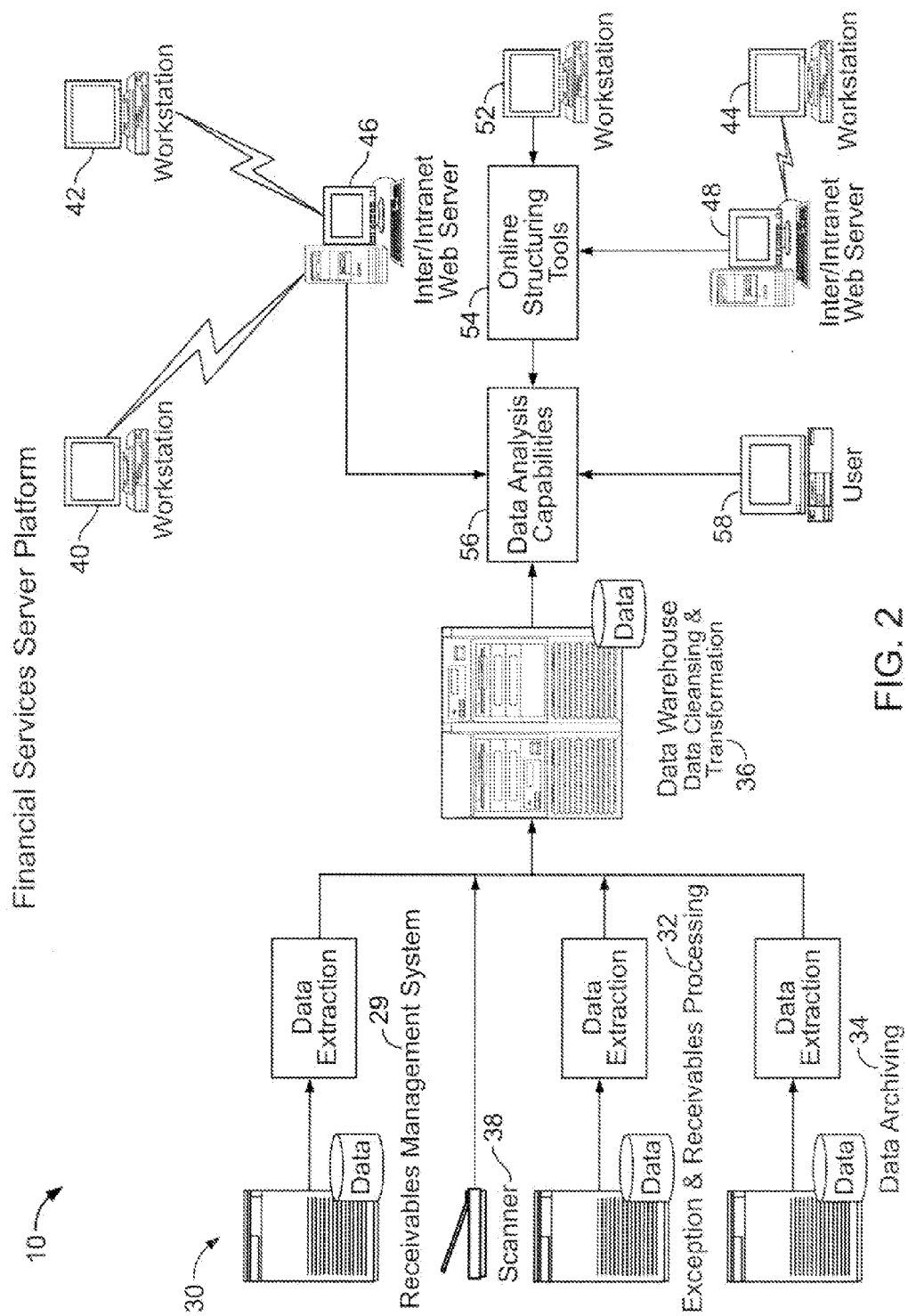

FIG. 2 is a block diagram of the financial services server platform.

Figure 3:
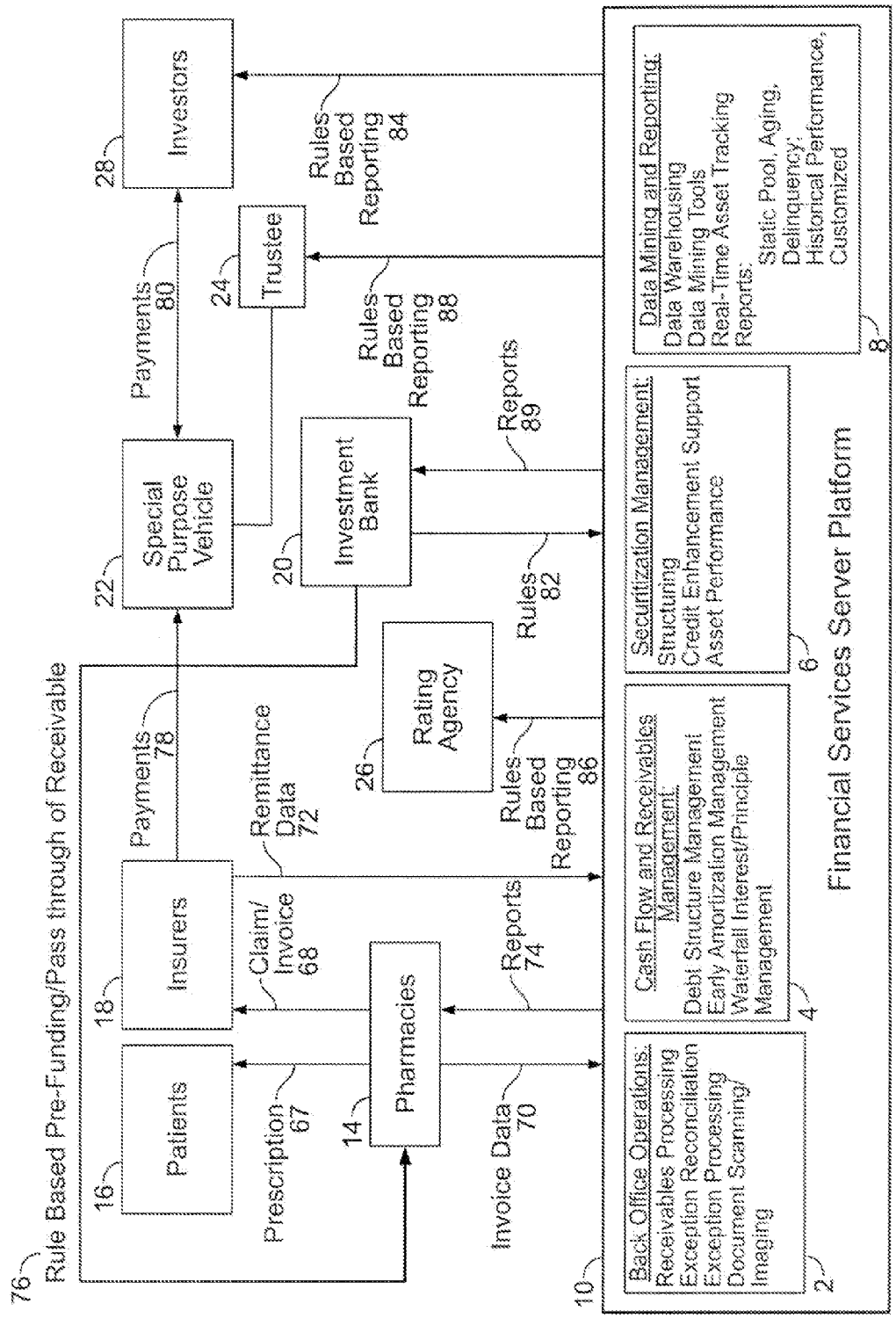

FIG. 3 is a dataflow diagram showing interrelationships between the parties to securitization and how the financial services server platform supports them.

Figure 4:
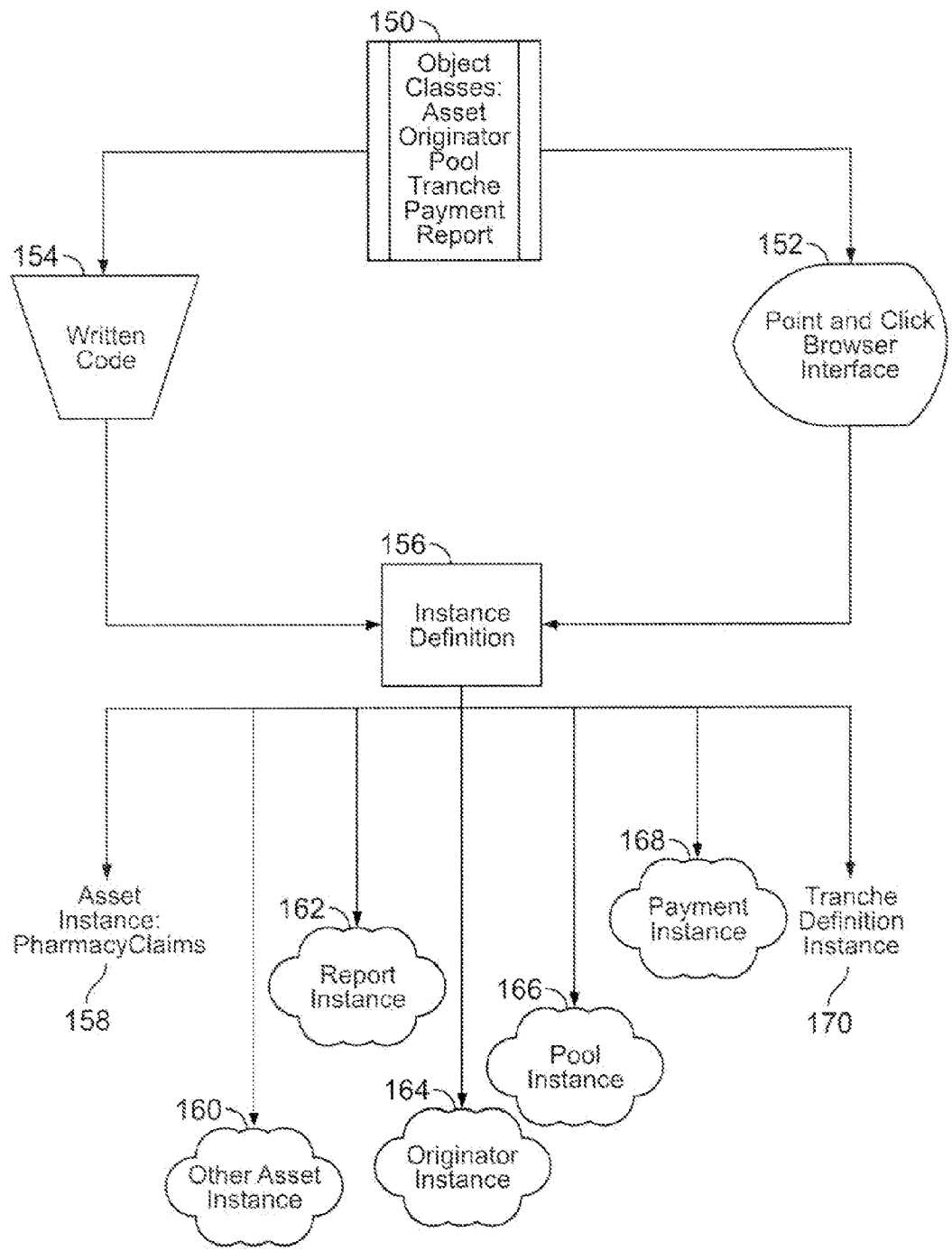

FIG. 4 is a block diagram of a system for defining instances of abstract object classes.

Figure 5:
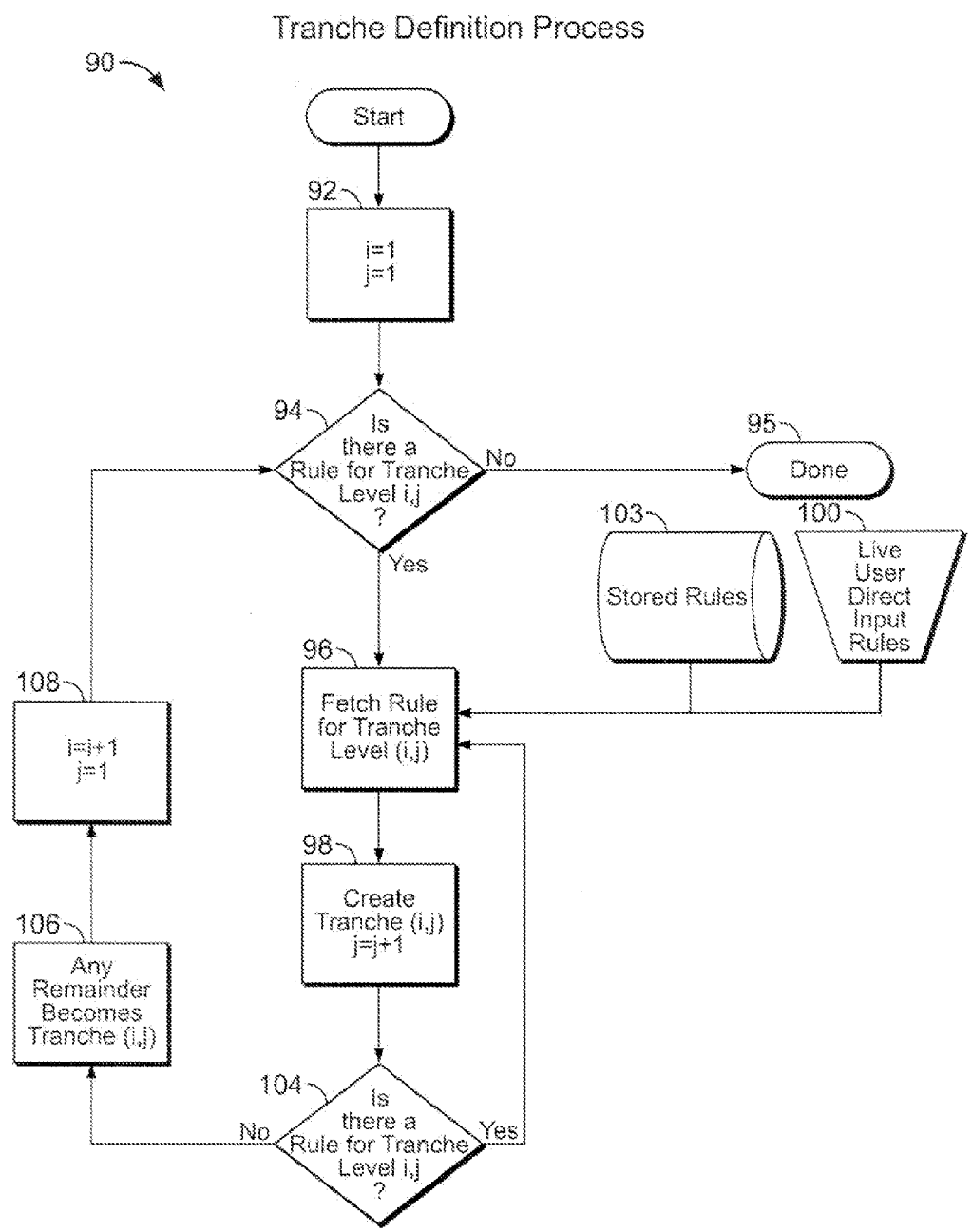

FIG. 5 is a flowchart of a process for managing tranches.

Figure 6:
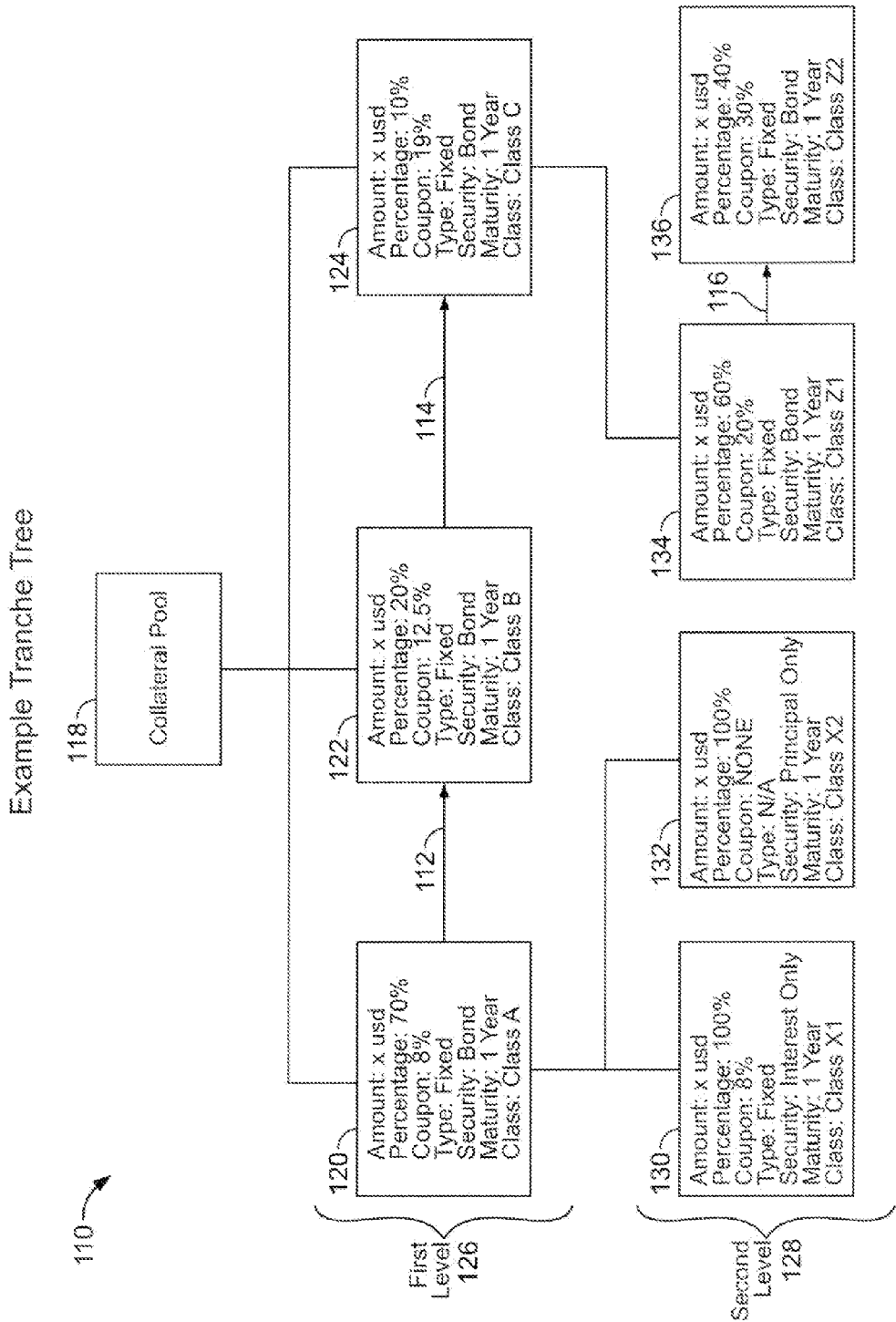

FIG. 6 is a block diagram showing a tree structure representation of a collateral pool.

Figure 7:
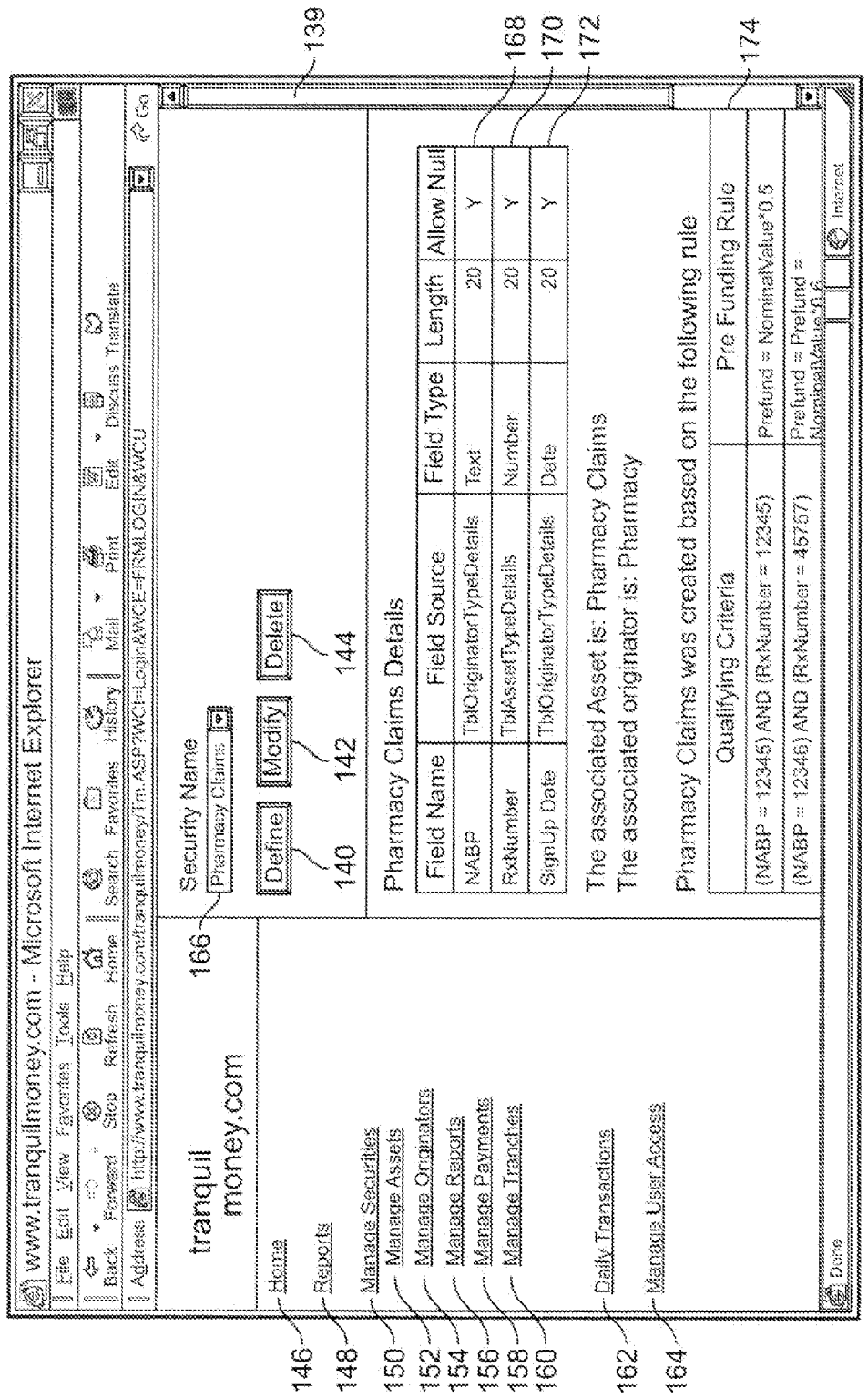

FIG. 7 shows a computer display showing an asset management function of the platform as displayed to a user connected to the platform over network.

Figure 8:
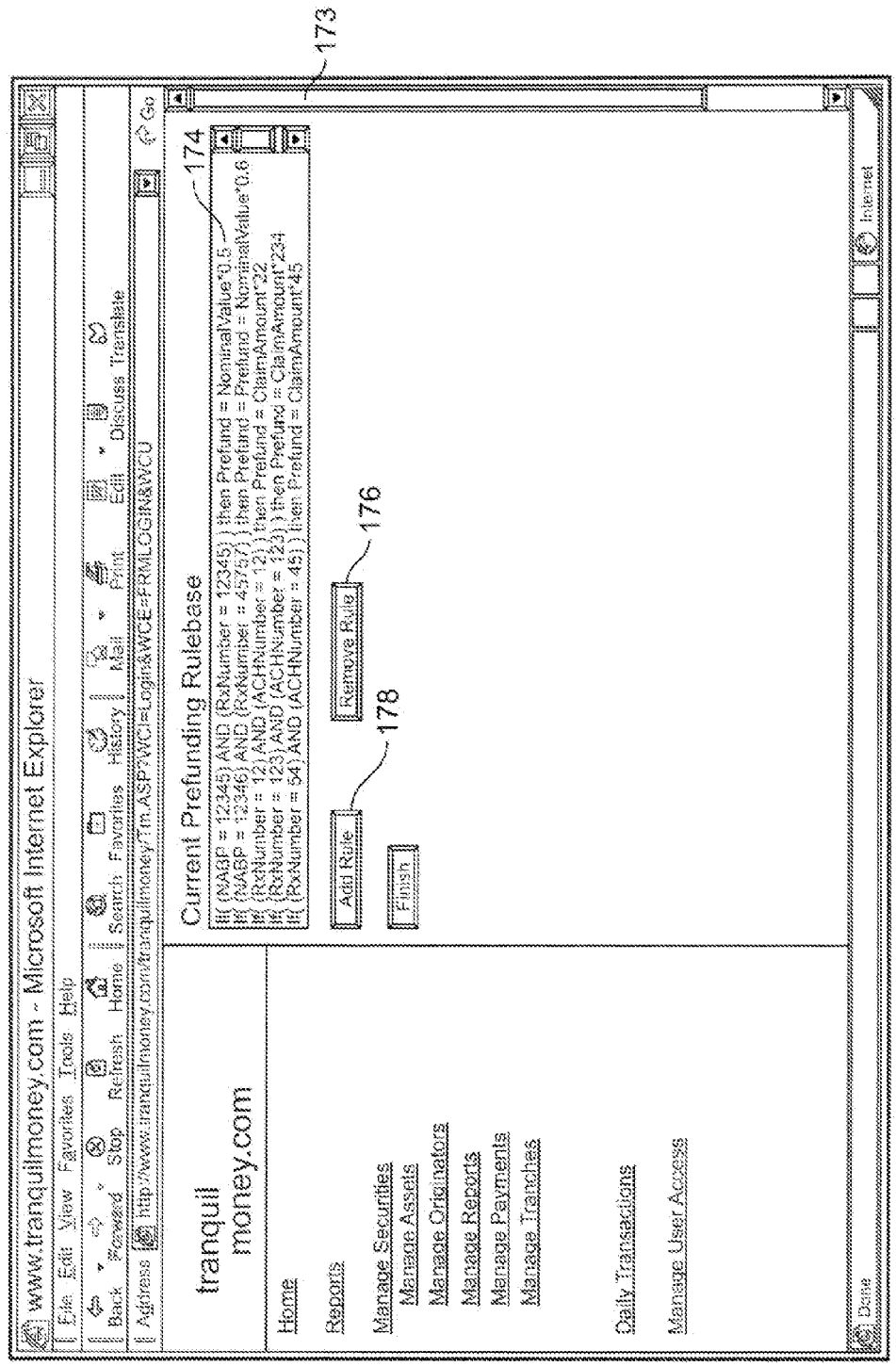

FIG. 8 shows a computer display showing a prefunding rulebase management function of the platform as displayed to a user connected to the platform over network.

FIG. 9 shows a computer display showing a rulebase definition function of the platform as displayed to a user connected to the platform over network.

Figure 10:
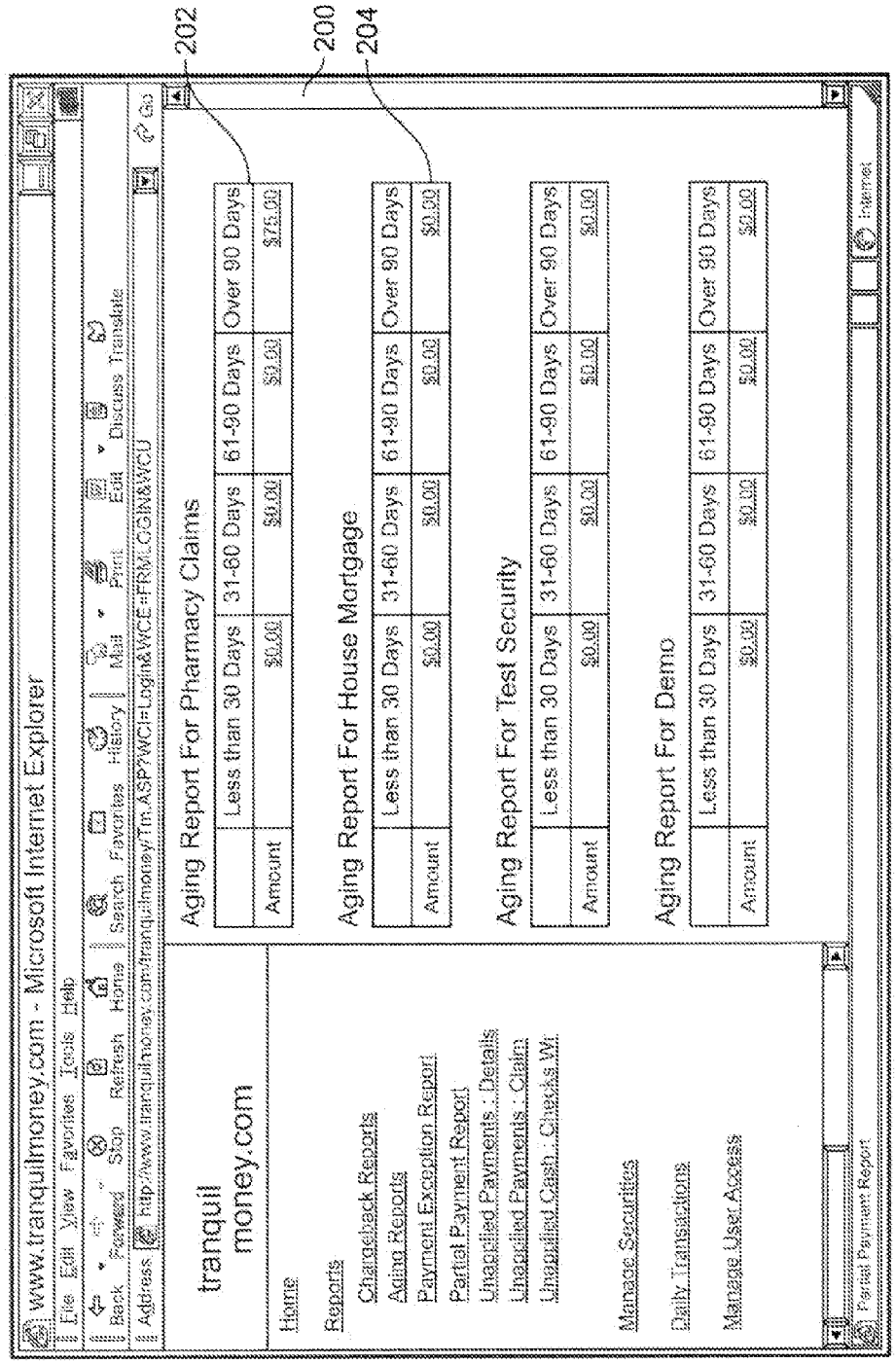

FIG. 10 shows a computer display showing an aggregate aging report function of the platform as displayed to a user connected to the platform over network.

Figure 11:
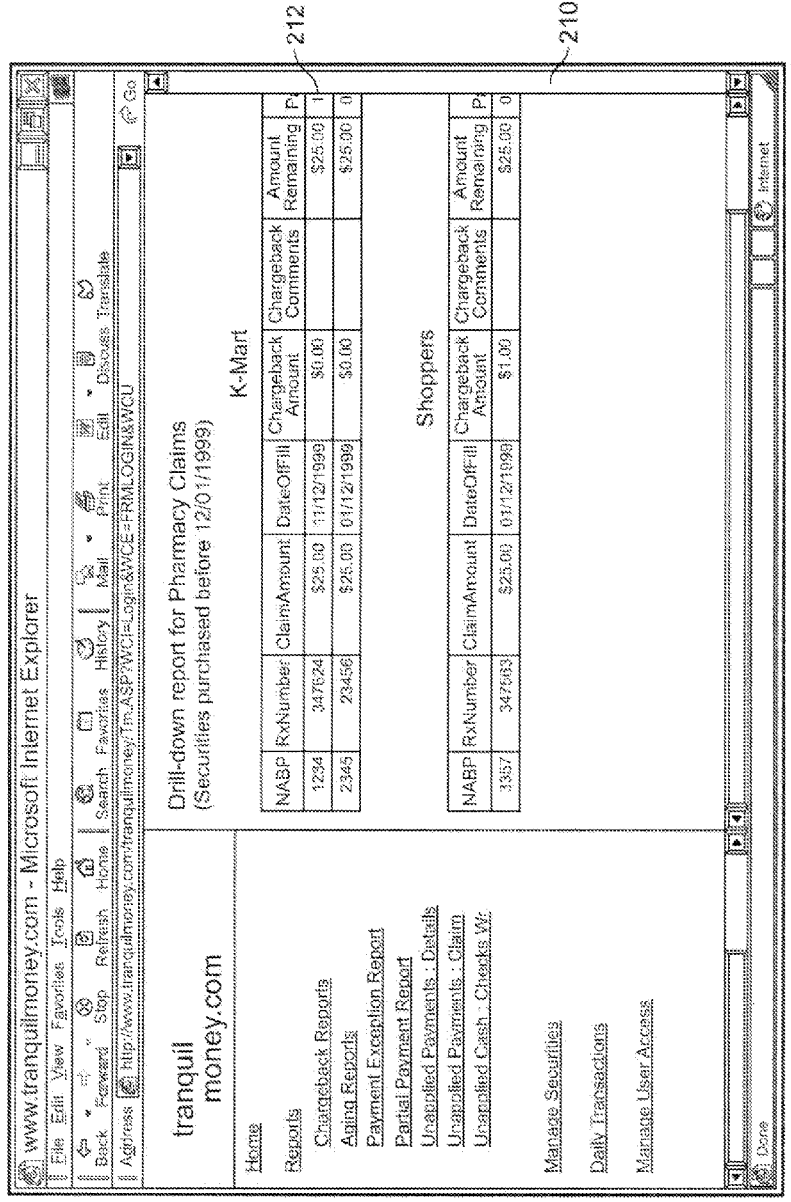

FIG. 11 shows a computer display showing a detailed individual asset reporting function of the platform as displayed to a user connected to the platform over network.

Figure 12:
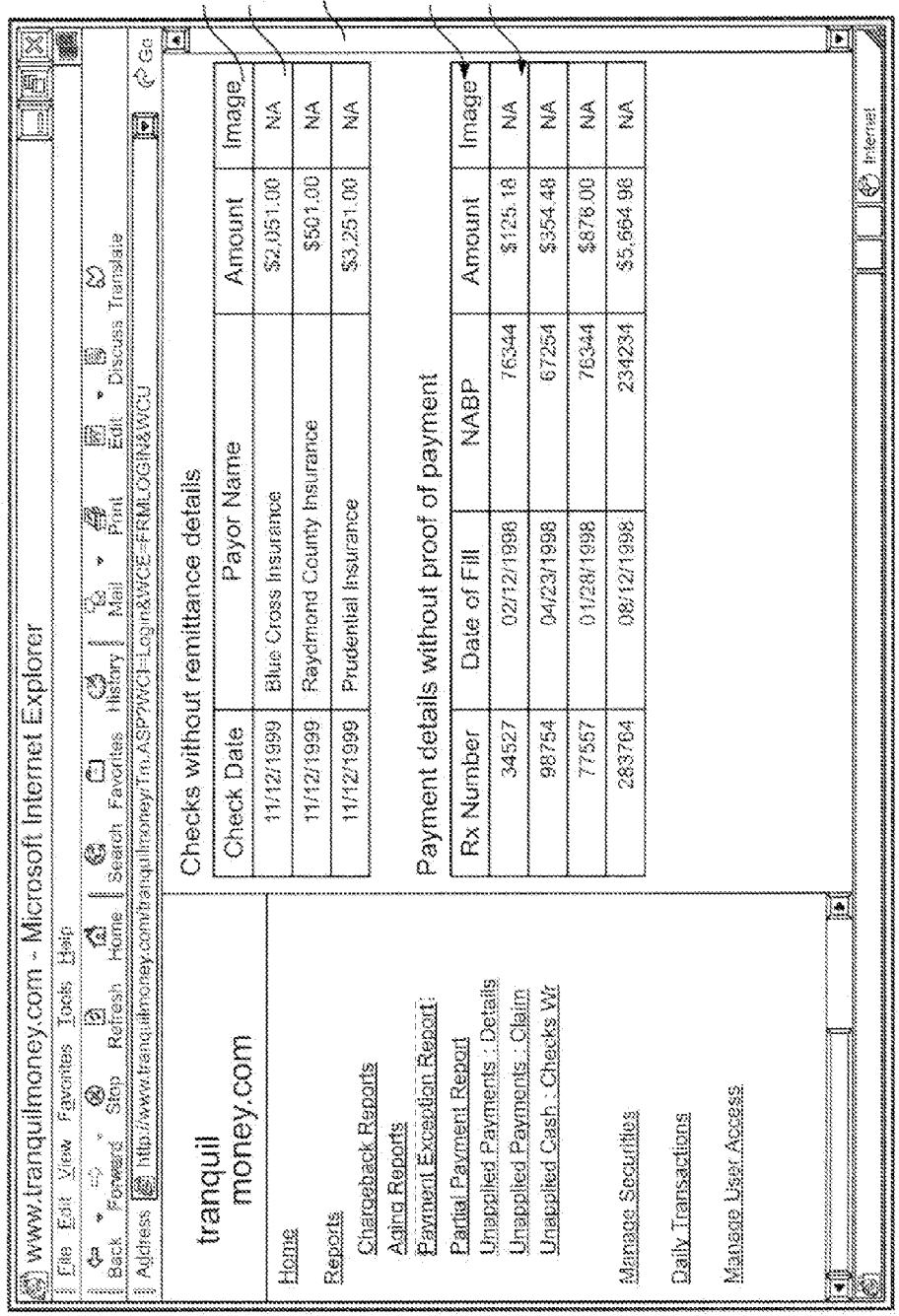

FIG. 12 shows a computer display showing an exception report management function of the platform as displayed to a user connected to the platform over network.

Figure 13:
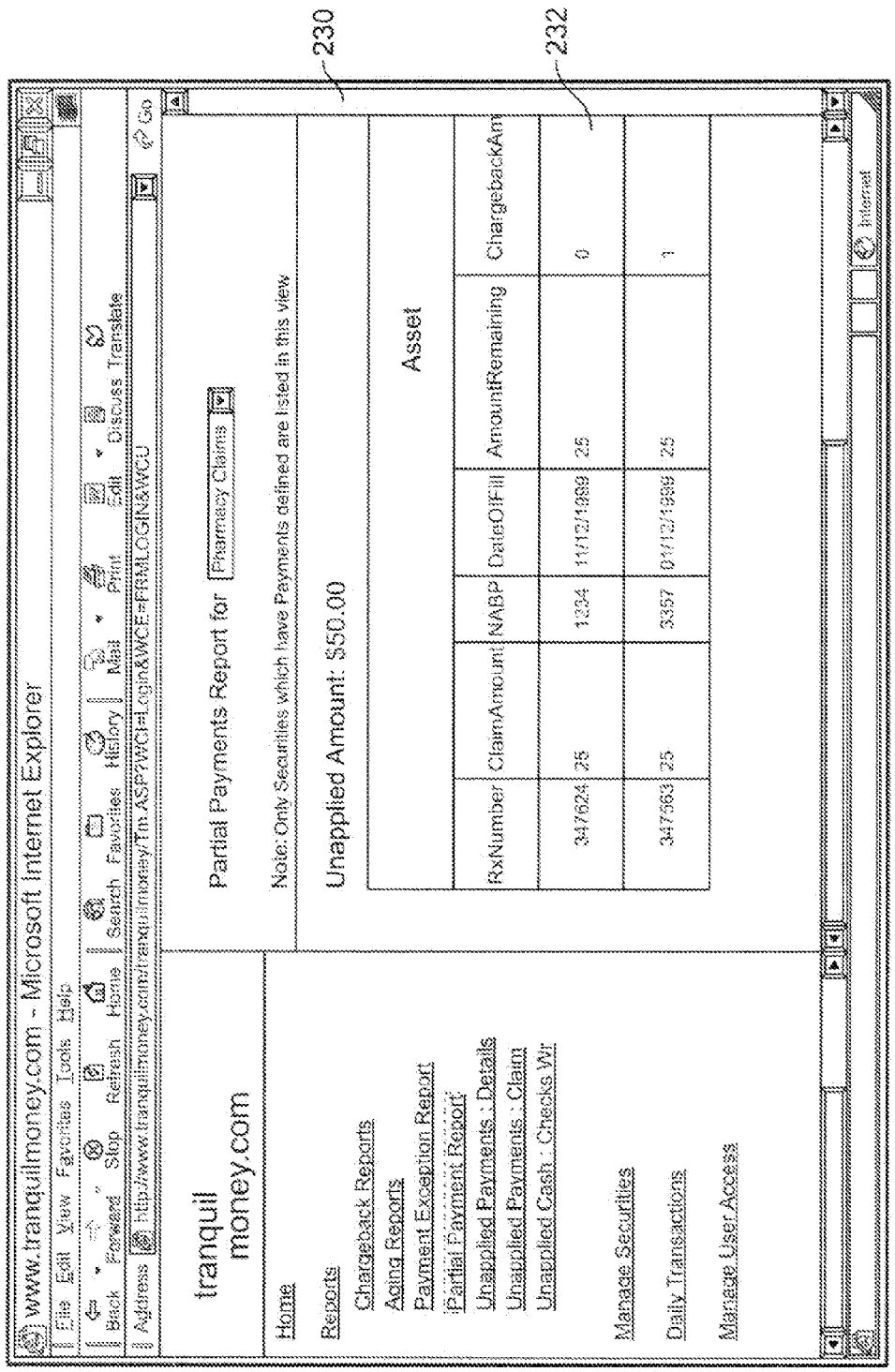

FIG. 13 shows a computer display showing a partial payment management function of the platform as displayed to a user connected to the platform over network.

Figure 14:
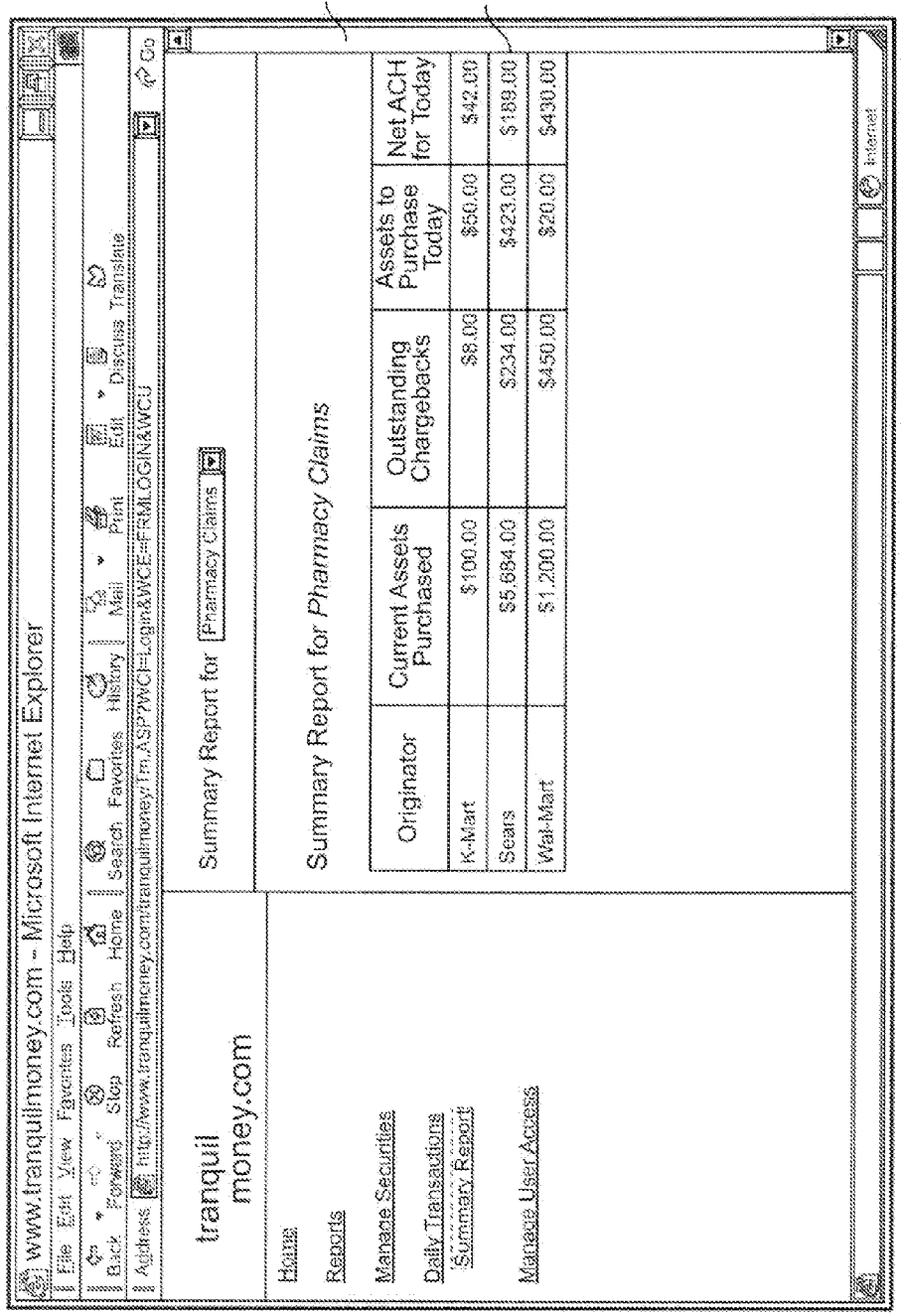

FIG. 14 shows a computer display showing a summary report of assets by originator function of the platform as displayed to a user connected to the platform over network.

DETAILED DESCRIPTION

Referring to FIG. 1, a financial services server platform 10 provides support services to participants in a securitization transaction. For ease of reference, the financial services server platform is called the "platform." The platform 10 includes several sub-functions, described below in greater detail, which include back office operations 2; cash flow and receivables management 4; securitization management 6; and data mining and reporting 8.

The platform includes within the securitization management 6 function a securitization structuring system by which a purchaser of securities can define rules, which define characteristics of assets that the investor desires to purchase. For example, one purchaser may prefer mortgages from a selected zip code and not another zip code. Other purchasers may prefer a higher risk, i.e., sub-prime market, pricing the security knowing that a higher portion of the portfolio of loans may go bad. The securitization structuring system supports the definition of rules to describe in abstract terms the particular characteristics of securities a purchaser wishes.

The data mining and reporting 8 function supports creation of reports to the various parties in the securitization process. An investment bank 20 can obtain detailed reports on selected classes of assets, and can provide rules by which investors may obtain customized reports on the underlying assets in the pool in which the investors have purchased interests. Investors 28 can obtain any degree of detail regarding the assets in which they have invested, down to the individual asset level should they wish. Similarly, investment rating agencies 26, such as Standard and Poor, may have rapid access to the legal documentation (which is scanned into the platform 10 and logically linked to the related asset).

The platform 10 provides a suite of back office operations 2, including receivables processing, exception reconciliation, exception processing and document scanning. Supporting documentation of the underlying assets may be scanned into the platform and made retrievable. Exceptions may include a payment which does not match the amount due on an account because of an error, or which cannot be associated with an account, or which the payor may have determined to pay an amount different from the face amount.

The securitization managements function supports the structuring of custom tranches. For example, an investment bank may wish to define a security based upon assets with a specified set of characteristics. For example, an investment bank 20 may wish to purchase only accounts receivable from that set of accounts receivable of which, based upon a six-month history, eighty percent are paid in under 40 days. There are two components of rules that may be employed in selecting assets into pools: (i) rules to decide which assets to purchase based on the characteristics of the assets themselves and (ii) rules to decide which assets to purchase based on their effect on the aggregate parameters of the pool that would change if the assets were to be added to the pool. The latter are called "covenants". When covenants are violated, the platform provides an interactive tool to exclude certain assets so that covenants will not be violated.

The financial services server platform 10 supports each of the entities involved in the securitization process. In the particular example shown, retail pharmacy accounts receivable constitute the underlying financial asset. Other kinds of financial assets can be used.

The parties are coupled to the platform 10 via the Internet 12, direct connections or other networked type of arrangements (not shown). A pharmacy 14 fills a prescription for a patient 16 providing an account receivable from an insurer 18 to the pharmacy 14. Documentation related to this account receivable may be in the form of paper, or it may be in the form of an electronic transaction. Electronic transactions may be provided directly over the Internet to the financial services server platform 10. Paper transactions are physically forwarded to the financial services server platform 10 for processing.

A business, e.g., a pharmacy 14, can turn an accounts receivable into cash by selling the account receivable, such as to an investment bank 20. The investment bank 20 forms a pool of such accounts receivable. Details of each account receivable are maintained in the database maintained by the financial services server platform 10. The investment bank 20, based upon the information available in the financial services server platform 10, may define rules setting forth the characteristics of accounts receivable it is willing to purchase. Similarly, either investors or the investment bank may provide custom tranches of a pool of accounts receivable in accordance with rules that each may define. The financial services server platform 10 provides the mechanism for the production and application of such rules.

The investment bank 20 typically forms a special-purpose vehicle 22 to hold the pool of financial assets, in this case being accounts receivable. The special-purpose vehicle 22 is typically a corporation or other legal entity formed for the sole purpose all holding the assets. A trustee 24 oversees the operations of the special-purpose vehicle 22. The trustee 24 has access to information regarding the performance of the accounts receivable held by the special-purpose vehicle which information is maintained by the financial services server platform 10.

Different users will have different permissions to view different aspects of the information that is maintained in the platform, as discussed in more detail below. For example, individual investors 28 may have permission to look only at data that relates to assets within a tranche of assets in which they have invested. Reporting and access to information are made available by the platform over the Internet 12 to authorized users. The rating agency 26 can review all of the details and underlying legal documentation related to the pool of accounts receivable by accessing the information contained on the financial services server platform 10. Because all of the information needed is available online, the process of rating the securities to be offered for sale by the investment bank 20 is more efficient. The rating agency 26 is able to receive real-time collateral security level data, the cash flow waterfall, and historical asset performance data including default, prepayment and delinquency data in order to rate the securities issued based upon the underlying assets.

Investors 28 may purchase interests in the pool of accounts receivable, or tranches of the pool, and can obtain information about the performance of the pool and individual account receivable from the financial services server platform 10. Investors may define rules to create custom reports. What information investors 26 are permitted to see may be limited by rules defined by the investment bank 20, as discussed below.

By being able to define tranches at will, an investment bank 20 can define a security with an investment rating by design. In order to define such a security, the platform provides the capability for the investment bank 20 to define rules. The rules can be implemented as a set of if/then clauses. On the "if" side, a user establishes the characteristics of assets. On the "then" side, a user establishes what will be paid. For example, in the case of an account receivable, this might be a pre-funding amount: either the face value of the receivable, or an over collateralized amount. An over collateralized amount is the amount a purchaser will extend less than face value against the asset, with the balance payable upon collection of the asset. Additionally, there is a fee, or interest rate, that may be charged. For example, in the purchase of an account receivable, there may be a one percent nominal fee.

The platform provides a vertical integration of functions that have in the past been spread among at least three entities: (i) securitization management (selecting of assets into the pool) usually done by the banking department of the investment bank (20); (ii) cash flow and receivables management (4) (usually done by a servicer (not shown)) and (iii) Deal Management (the tranching and cash flow distribution to tranche holders) usually done by the Trustee (24).

Referring to FIG. 2, the financial services server platform 10 includes a receivables management system 30, an exception and receivables processing system 32, and a data archiving system 34 each provide data and services to a data cleansing and transformation process within a data warehouse 36. The platform is image enabled and supports document scanning 38 on site, with remote processing and data import with image indexing.

From the user side, workstations 40, 42 and 44 connected to the platform through the Internet or an intranet through servers 46 and 48, and local workstations 50 and 52, may access services from the platform. Online structuring tools 54 permit a user to define tranches, define asset classes and access rules for other users. Users are prompted by a series of screens for the various functions they may wish to access. Similarly, users may access the data analysis capabilities 56 (their access being in some cases defined by rules defined by other users, as discussed below.)

Referring to FIG. 3, the retail pharmacy industry is a market where securitization of accounts receivable is desirable. Individual pharmacies 14 routinely produce a relatively large volume of accounts receivable of small dollar value, typically in the range of $15 to $50. For example, a patient 16 presents a prescription to be filled, and an insurance identification card. The pharmacist contacts the insurance company 18, often by an automated on-line adjudication system, to confirm that the patient has insurance coverage, and to determine the amount of the prescription charge that will be covered by the insurance, and the co-payment amount that must be collected from the patient. This series of transactions produces an account receivable from the insurance company 18. The pharmacist monitors payments received (frequently from a large number of different insurance companies) and must match the payments against the receivables, called account reconciliation.

The process of account reconciliation, which involves both electronic and paper data, can be time-consuming, costly and complex. Frequently, the amount paid will not match the amount of the corresponding receivable. The insurance company may make a determination that it was in error when it approved the original transaction and unilaterally alter the amount actually paid. Errors are made. Because of the small dollar amounts involved in an individual account receivable, a pharmacist may not pursue a discrepancy because it is not worth the cost in time and effort involved. Additionally, while the account receivable remains outstanding, the pharmacist 14 is in effect making an interest free loan to the insurance company pending receipt of payment. Insurance companies are not encouraged to make prompt payment, but rather hold the money for as long as may be. Because of the small amounts that may be involved with an individual insurance company, a pharmacist is discouraged from actively pursuing prompt payment.

Historically, retail pharmacy accounts receivable have not been a good candidate for securitization. Their short-term nature and the difficulty of review of the underlying paperwork and small amount of the individual transactions have made it difficult to securitize these assets. The platform addresses these and many other issues, and makes securitization of such assets more feasible.

Referring to FIG. 3, the financial services server platform 10 supports many aspects of the securitization process. The financial services server platform 10 includes floor and basic operations: back office operations 2, cash flow and receivables management 4, securitization management 6, and data mining and reporting 8.

Back office operations 2 include receivables processing, exception reconciliation and processing, and document scanning and imaging. Underlying legal documentation and paper transactions are scanned and logically associated with the relevant financial asset.

Cash flow and receivables management 4 includes debt structure management, early amortization management, and waterfall interest/principal management. As payments are received, the cash flow and receivables management 4 function allocates payments and losses (the waterfall) in accordance with an asset tree structure (an example is shown in FIG. 5) The asset tree structure defines a hierarchy of seniority of tranches. Payments are applied in order of seniority, and losses are applied in reverse order of seniority.

Securitization management 6 includes defining rules for purchase of financial assets, and tranches. It also provides for credit enhancement support. The securitization management function 6 provides the structure and information for an insurer to ensure the collectibility of selected financial assets. Securitization management 6 also provides a process by which rules may be defined to permit interested parties to review asset performance for assets within the pool of assets that the party has an interest in.

Data mining and reporting 8 includes data warehousing, data mining tools to extract information and real-time asset tracking. The data mining 8 function also supports reporting such as static pool, aging, delinquency, historical performance of assets, and customized reporting. For example, the payment history of various insurance companies may be maintained on the financial services server platform 10 and obtained through data mining. Accordingly, an investor may choose to purchase interest only in account receivable from a particular group of insurers.

Patients 16 have their prescriptions 67 filled by pharmacies 14 which produces a claim 68 (an account receivable) against an insurer 18. The invoice data 70 regarding claims 68 is provided to the financial services server platform 10. This may be in the form of paper documentation, or electronic transaction information conveyed over the Internet or other communications medium. The financial services server platform 10 can then provide services to the pharmacy 14 in the form of processing the claim 68, and reconciling remittance data 72 with invoice data 70 and claims 68. Because all information related to each account receivable is maintained on the financial services server platform 10, exception processing and errors may be dealt with more efficiently. Financial services server platform 10 can provide reports 74 to the pharmacies 14 regarding the status of their accounts receivable.

A pharmacist may not desire to carry the accounts receivable, but rather sell them and receive the cash immediately. An investment bank 20 purchases accounts receivable from pharmacies 14 (in some cases through a bank, not shown). The investment bank 20 pays the pharmacies in accordance with rules based pre-funding terms 76.

In accordance with the pre-funding terms, payments 78 from the insurers 18 on the claims 68 are redirected by the investment bank 20 to a special purpose vehicle 22. The special purpose vehicle 22 is an entity formed by the investment bank 20 to hold the accounts receivable 68. Investors 28 may purchase interests in the special purpose vehicle 22. The special purpose vehicle is under the direction of a trustee 24, acting on behalf of the investors 28.

As claims 68 are paid by the insurer 18, the payments 78 are directed to the special purpose vehicle 22, the owner of the accounts receivable 68. As income is realized, periodic payments 80 are made to investors 28 in accordance with their respective investment terms.

The investment bank 20 can define rules 82 to the financial services server platform 10 with respect to what financial assets it will purchase, defining tranches of those assets, what reports 89 it wishes and further rules defining what reports and information 84, 86 and 88 regarding those financial assets will be made available to investors 28, rating agencies 26 and the trustee 24 respectively. The investment bank may further define asset classes (as discussed below) and custom tranches.

Investors can obtain reports 84 from the platform 10 regarding the performance of the assets held by the special purpose vehicle 22 in which they have invested. In accordance with rules defined by the investment bank 20, investors can obtain not only summary reports, but also can obtain detailed information down to the individual asset level.

Referring to FIG. 4, the platform provides basic classes 150 (objects) of Asset, Originator, Pool, Tranche, Payment and Report. These classes provide an abstracted structure within which various aspects of the securitization process may defined, called instances. The class structure provides a set of minimum fields required in each class, as well as a minimum definition of relationships between instances of other classes and operations which may be performed on data within each instance of these classes.

The definition of a particular instance of a class from a class causes a data structure to be generated by the instance definition 156 function of the platform 10. For example, the definition of a particular asset, e.g. a retail pharmacy claim, causes a retail pharmacy claim asset instance 158(data structure) to be generated by the instance definition 156 platform. Similarly for the other object classes, data structures will be generated. There are some essential fields that all asset class instances will have such as Original Balance, Current Balance, Payment Schedule, which will be added to all newly defined asset classes. Similarly for the other object class instances, data structures will be generated.

The rules defined for purchasing assets into a pool are also specified while designing a pool, and the structured query language (SQL) code or equivalent, needed to implement the rules is generated by the platform and stored as stored procedures in the generated database tables. The tree definition of the tranche structure will also generate both data structures (database tables) and code (translated to SQL code). [Note that in the tree structure, each tranche can be Interest Only, Principal Only, or a Bond (Interest plus Principal]

The specification of the instances can be done via a point-and-click interface 152 using a browser, or by writing computer software code 154. They are also interchangeable: if a user specifies a set of objects through the point-and-click interface, the user can export it to the platform 10 as code, or import a computer software code object specification and view/modify it in the point-and-click interface 152.

A user of the platform 10 may define new asset classes. For example, to provide pharmacy claims as a security a user could define an asset class called PharmacyClaims having the fields:
Chain code
NABP number
Rx Number
Date Of Fill
Amount
Adjustment Codes In addition, certain other fields are included such as import directory; export directory; XML (extended markup language) document type definition (DTD) filename with path; an AssetID to assign a unique number; Amount Repaid which will be updated when payments are received against the asset; Chargebacks and Chargeback Comments.

The platform 10 generates the asset class instance (table) PharmacyClaims 158 as a specific instance of the Asset class. The user may assign and de-assign permission to specific users or groups to view fields within PharmacyClaims 158. The system will generate an XML language document type definition (XML DTD)that defines an import-export format for records into and out of this table.

Similarly, instance definitions may be defined for other asset instances 160, report instances 162, originator instances 164, pool instances 166, payment instance 168 and tranche definition instances 170.

In another aspect, the platform supports the similar abstraction of financial assets. Assets may be described not in terms of their underlying transactional nature (i.e. mortgage loan, account receivable, promissory note) but rather in terms of their common financial characteristics, and managed similarly. The platform manages the abstracted representation of a pool of financial assets and the tranches of such assets in a tree structure (discussed below) which simplifies the process of waterfall management or allocation of income and losses among various tranches of a pool of financial assets.

The investment bank 20 and investors 28 can define custom tranches of pools of assets. Rules are used to define a hierarchy of nodes each of which nodes defines a tranche, and the hierarchy defines the waterfall. The nodes have the at least the fields shown in the table below:

| | |
|---|---|
| Amount | The dollar amount of the tranche |
| Percentage | What percent of the entire collateral pool this tranche is |
| Interest | The coupon paid on the bond |
| Type | The convention on which the interest is paid, fixed or floating |
| Type of security | Interest only, principal only, bond, collateral, cash |
| Maturity | Maturity of the Tranche |
| Cusip | Cusip number |
| Class | Class designation |

Referring to FIG. 5 a process 90 for defining a tree of tranches of a given pool of assets is shown. At each level i of tranches there may be sub categories j of tranches. Beginning at the top level (i=1), indices i and j are initialized 92. The process 90 determines 94 whether there is a rule. If not, the process is done 95. In the simplest case, there would be one tranche of the entire pool. If there is a rule, the rule is read 96 and the tranche is produced 98 in accordance with that rule. Rules may be obtained online directly from users 100 operating from a terminal, or may be supplied on tape or other storage media 102.

The sub-tranche index j is incremented 98 and the process 90 determines 104 if there is another sub tranche to be defined at this level i. If there is another sub-tranche, the rule for the next sub tranche is read at 96 and the process 90 continues. If there is not another sub-tranche at this level, any remainder of the pool of assets at level i becomes tranche i,j 106. The level index i is incremented 108 and the process continues for the next level of tranches 94.

Referring to FIG. 6 an example tranche tree 110 is shown. The tranche definition process 60 produces a tree 110 representation of tranches. Arrows 112, 114, and 116 indicate a relationship of seniority. Solid lines indicate from what tranche a sublevel of tranches is derived.

From a collateral pool 118, three tranches 120, 122 and 124 have been defined at the first level 126. In this example, tranche 120 is called class A, and is senior to tranche 122, called class B. Tranche 122 is in turn senior to tranche 124, class C.

At the second level 128, the class A tranche 120 has been further subdivided into two tranches 130 and 132. These tranches are not in a senior/subordinate relationship, but rather divide the class A tranche 120 into an interest only component 130 and principal only component 132. Similarly, the first level class C tranche 124 has been subdivided into two tranches 134 and 136, which are in the senior/subordinate relationship as shown by the arrow 116.

The rules definition process can define any asset class and pool/tranche structure. Not only can traditional tranches of securities be structured, defining simple senior-sub structures, the tree structure may be used to generate senior-sub, interest only-principal only (IO-PO) and cash-collateral structures of any complexity. With a floating tranche derived from a fixed interest tranche, one may implicitly define a swap. With a currency field attached, it can also handle currency swaps. With interest only and principal only tranches a user can separate pre-payment risk from default risk.

New tranche structures may be defined as needed. Specialty finance users may utilize their particular knowledge about some particular asset class to make a profit by taking a risk the user understands and others do not.

Seniority (shown by arrows across 112, 114, and 116) determines which tranche gets paid and in which order. For example, using the tree structure shown in FIG. 5?, and assuming the principal amount of the entire pool is one dollar, if one dollar of principal is collected by the servicer on the collateral pool then 70 cents are paid to Class A 120, 20 cents to Class B 122 and 10 cents to Class C 124. Payments flow in order of seniority, shown by the arrows 112 and 114. Losses, on the other hand, flow right to left. This means that if only seventy-five cents of principal are collected then Class A 120 is paid down fully, receiving seventy cents and Class B 122 gets five 5 cents. Class C 124, the most junior, does not get any payment.

Tranches may further distinguish between interest and principal. For example, if, in addition to $1 of principal, the collateral pool 80 bears interest at the rate of ten percent per annum, then this interest in also allocated to each of these tranches in order of seniority. Assuming payments are applied first to interest and then to principal, Class A 120 is paid interest and then principal; then Class B 122 is paid interest, then principal and so on. Class A 120 in turn passes on all of its interest to Class X1 130 and all of its principal to Class X2 132. Assuming for this example that ten cents of interest is available on the collateral. Class A 120 gets seventy percent times the Class A 120 coupon rate eight percent, or 5.6 cents. Class B 122 gets twenty percent times the Class B 122 coupon rate 12.5%=2.5 cents. Class C 124 gets ten percent times the Class C 124 coupon rate nineteen percent=1.9 cents. In turn, the Class Z1 134 and Z2 136 share the Class C 124 1.9 cents in order of seniority.

The tree and example described are for the purpose of illustrating the concept. This methodology can be used with any level of complexity. For example, a special case of the hierarchy is a pass-through. In this instance all nodes are removed except the collateral pool node. The platform software applications may be hosted centrally and subscribed to and used by users locally, over the Internet and through intranets or other communications mediums.

As a non-limiting example, one particular type of asset could be called a PharmacyClaim, with the Originator being Pharmacy, the Pool being, XYZ Investment Bank Pharmacy Pool #822, and the Tranches being 90% Senior, broken out into 10 and P0, plus 5% mezzanine as a Bond, plus 5% equity covered by cash reserves. The Payment type in this case would be Remittance Advice (RA) consisting of a Check/EFT record, and a PA Detail record.

Another investment bank may define an Asset as a Residential Mortgage, with the Originator being Regional Banks, the pool being, say, ABC #123, and a complex Tranche structure with senior-sub and IO-PO characteristics. The Payment object here would be an Installment, with a check record.

The only thing that is enforced is that the "loan" related fields are compulsory: Original Balance, Current Balance, Principal, Interest, Payment Schedule (an array of Dates, Principal Due, and Interest Due). Each Tranche, being essentially an asset, must contain the same compulsory fields. These financial fields are reflected in the Pools into which assets are bought as well.

Accordingly, many different kinds of financial assets may be managed by the Platform 10 according to the common financial characteristics derived during the abstraction process—i.e. each type of financial asset is described and managed by the Platform 10 in accordance with the characteristics common to all of the financial assets as defined by the compulsory fields.

Permitted users may log in and define any type of asset, any type of originator, and any type of pooled security based on those assets and originators. The platform supports specification of rules for automatic repurchase of assets by the originator, such as, in the case of retail pharmacy accounts receivable, a claim which is subsequently denied. The platform also supports rules to be changed periodically, so that, for example, an investment bank purchaser may create a purchase rule for a limited class of assets within a pool, and later, as a comfort level has been reached, expand that class, or, conversely, restrict it. Different purchasers may set up different purchase rules. The platform automatically generates data interface specifications for import of asset and payment data from foreign systems, and export of reconciliation data back to those or other systems.

The platform provides the following services:

Structuring Support:

An aggregate security can be defined by the structurer by a set of rules defining which assets will be purchased, with how much over-collateralization, with/without recourse, and at what price (fee/interest rate)

Contract Management Support:

The rule base can be exported to a legal documentation system and used to generate the paperwork necessary for the Purchase of Assets contract.

Distribution Support:

When the structurer re-sells portions of the security to others, payments received belong to and must be allocated among the various purchasers of the asset-based securities. The platform keeps track of the appropriate allocations and generates the electronic funds transfer (EFT) file for funds transfer each day.

Support for Credit Enhancement:

(Senior/Subordinate Debt)

When selling portions of the securitized assets to others, the platform allows definition of which purchasers have to take the first credit losses if any. Regardless of which particular claim defaulted, the "senior" investor will not take the loss. The subordinate investor agrees to take a percentage of the first losses in exchange for a higher yield to compensate for the higher risk position.

The platform 10 includes several tools to support its services. While in the implementation described herein specific tools are mentioned, it is not necessary that these specific tools be used. That is, other similar tools may be provided to supply similar functions.

A high-speed, high-volume, image-assisted production imaging and workflow management application supports setting up custom workflow and business rules. Once the workflow is defined, the software ensures that each batch passes through each process step. The application has a set of workflow-enabled applications for production key-from-image data capture. These applications include (i) a high-performance key-from-image application; (ii) a form designer; (iii) an importer for importing scanned images; (iv) an exporter: for exporting data into any desired output data format; and (v) an administration console for managing user access, customizing the workflow required, reporting, statistics, etc.

The platform 10 also includes an image warehousing 36 and archival system for management of scanned images on magnetic or optical storage media such as CD-ROMs. It allows users to search for documents and images using user-defined keywords (indexes). It includes a publisher used for publishing warehouses of images, and a viewer used for retrieving and viewing the images locally and over the Internet.

Images are stored across volumes on hard drives or offline on any storage media. The system will prompt the user to put the appropriate CD volume into any available drive in order to view the image. Keyword (index-based) searches can be done even for documents in offline volumes.

The platform 10 supports automatic disaster recovery and replication by storing index data on the CD's with the image data. The archive can therefore be reconstructed from the CD data at any time.

The platform also includes an application which manages batch-oriented high volume scanning operations. This application can manage multiple jobs with different types of forms, and maximizes the productivity of scanner operators. It supports re-scan of missed or poor quality documents, automatic batch counting for reconciliation, encryption and compression of image data, and transmission of data across a secure Intranet for processing.

FIG. 7 shows an asset management screen function 139 as shown to a user connected to the platform. The user may be connected to the platform locally or by a local area network, by a wide area network, or by a global network such as the Internet.

The asset management function screen 139 includes buttons 140, 142 and 144 allowing a user to define 140 securities (assets), modify 142 existing securities and to delete 144 existing securities. Existing securities are selected by a Security Name scroll down 166.

Many screens showing functions of the platform have a common menu of hyperlinks to other functions. For example, selecting the home link 146 will bring up a home screen. Access to other functions of the platform may be accessed similarly by selecting links for reports 148, manage securities 150, manage assets 152, manage originators 154, manage reports 156, manage payments 158, manage tranches 160, daily transactions 162 and manage user access 164.

The asset management function screen 139 shows a summary of fields associated with a particular asset, shown as Pharmacy claims in FIG. 7. As other assets are defined, they may be selected for viewing as well. The asset Pharmacy claims has three fields named NABP 168, RxNumber 170 and SignUp Date 172. Rules for prefunding Pharmacy 174 Claims are shown at the bottom of the screen.

FIG. 8 shows an existing prefunding rulebase management function 173, with a display of an existing prefunding rulebase 174. A user may select functions to Remove Rule 176 and Add Rule to modify the existing rulebase 174.

FIG. 9 shows a rulebase definition function screen 179. A user defines a condition for prefunding by selecting among existing fields in an asset by selecting in the Field scroll down 180, and then defines a condition by use of a relation operator scroll down 182, and an amount window 184. Relationship operators include equal (=), less than (<), greater than (>) and combinations of these. Rules may be concatenated and combined with a concatenation button 186 using logical operators "and" or "or". As a rule is developed, the condition portion of the rule appears in a Rule Window 188.

Having defined a condition for prefunding, the user then defines a prefunding rule. A rule consists of a mathematical operator and a scalar. In the example as shown in FIG. 9, the rule is formed by selecting an operator from an operator scroll down 101, and inserting a scalar in the input field 190. Additionally, a fee may be defined in a fee input field 192 and a fee operator scroll down 193. The user selects whether the prefunding is with or without recourse by selecting from the Yes/No recourse radio buttons 194.

FIG. 10 shows an aggregate aging report function screen 200. The report shows aggregate agings for selected assets, for example as shown in FIG. 10, for Pharmacy Claims aging 202 and House Mortgages 204.

A user with appropriate access rights (which are definable with the platform) may elect to see a detailed individual asset report (drill-down report) screen 210. The screen shows the details of individual assets by sorted in the example shown in FIG. 11, by originator. An individual asset report 212 shows details of the individual asset.

As payments are received with respect to assets, they must be matched with the appropriate asset and credited. Frequently, payments are received with insufficient documentation to match to an asset, or payments are claimed by payor which do not match the payments received. Such events are called exceptions. A user with appropriate privileges may view an exceptions management screen 220, which reports both checks without remittance details 222 and payment details without proof of payment exceptions 224. The platform supports the ability to show scanned images of the related documents by selecting the images 226 and 228.

As payments are received, they may not be for the full amount of the claim, resulting in a chargeback to the issuer. FIG. 13 shows a chargeback management function screen 230, with a report of chargebacks by individual asset 232.

A user may select to view a summary report of aggregate assets by originator 240, as shown in FIG. 14. Sorted by originator, a summary of assets owned, chargebacks, assets available for purchase and the net ACH amount for the day for the purchase 242 are shown.

The platform is not limited to the example shown of retail pharmacy accounts receivable. Other kinds of =accounts receivable and financial assets are suitable for management with the platform.

Other embodiments are within the scope of the following claims.

What is claimed is:

1. A system for managing financial assets comprising:
   a computer system to receive information regarding a pool of financial assets;
   a storage system coupled to the computer system, the mass storage system storing the information, and
   a computer program to execute on the computer system, comprising computer instructions to cause the computer system to:
      segregate the financial assets into a first category and a second category according to a first set of abstraction rules that define a hierarchy of the first and second categories of financial assets;
      segregate the financial assets contained within a first one of each of the first and second categories into asset classes according to a second set of abstraction rules that define a hierarchy of the asset classes;
      abstract information regarding a subgroup of the financial assets within the pool according to at least a first abstraction rule of the first set of abstraction rules stored electronically on the computer system, the first abstraction rule defining the subgroup according to user-defined specifications for purchasing financial assets;
      summarize the information provided by operation of the first abstraction rule; and
      provide information electronically regarding individual financial assets within the subgroup of the pool according to at least a second abstraction rule of either the first set or the second set of abstraction rules stored electronically on the computer system, the second abstraction rule defining at least one of the individual financial assets according to user-defined specifications for purchasing financial assets.

2. The system of claim 1 wherein the financial assets comprise accounts receivable.

3. The system of claim 2 wherein the computer system receives information regarding transactions related to accounts receivable in real-time.

4. The system of claim 1 further comprising:
   a computer program comprising instructions to cause the computer system to reconcile a transaction related to an financial asset.

5. The system of claim 4 further comprising:
   a computer program comprising instructions to cause the computer system to manage an exception related to the transaction.

6. The system of claim 1 further comprising:
   a scanner to scan a document related to a financial asset to make a scanned image, and to store the scanned image on the mass storage system.

7. The system of claim 6 wherein scanned images are displayed to an authorized user upon request.

8. A computer-based method of managing financial assets comprising:
   receiving and storing information regarding a pool of financial assets;
   segregating the financial assets into a first category and a second category according to a first set of abstraction rules that define a hierarchy of the first and second categories of financial assets;
   segregating the financial assets contained within a first one of each of the first and second categories into asset classes according to a second set of abstraction rules that define a hierarchy of the asset classes;
   abstracting information regarding a subgroup of the financial assets within the pool according to at least a first abstraction rule of the first set of abstraction rules stored electronically on a computer, the first abstraction rule defining the subgroup according to user-defined specifications for purchasing financial assets;
   summarizing using a computer the information provided by operation of the first abstraction rule;
   providing information electronically regarding individual financial assets within the subgroup of the pool according to at least a second abstraction rule of the first set or the second set of abstraction rules stored electronically on a computer, the second abstraction rule defining at least one of the individual financial assets according to user-defined specifications for purchasing financial assets.

9. The method of claim 8 in which the financial assets comprise accounts receivable.

10. The method of claim 8 wherein abstracting further comprises:
    abstracting information using a hierarchy of abstraction rules to define hierarchical subsets of the pool of financial assets.

11. The method of claim 1 further comprising:
    representing the hierarchy of the first and second categories of financial assets as a tree structure.

12. The method of claim 8 further comprising:
producing a report concerning individual financial assets within the subgroup of the pool according to the at least first abstraction rule with producing being constrained by the at least second rule.

13. The method of claim 12 further comprising:
requesting the reports based on the at least first rule through a client system that is coupled to a server system over the Internet.

14. The method of claim 12 further comprising:
scanning a document related to a financial asset to produce a scanned image, storing the scanned image and displaying the scanned image to an authorized user, wherein the authorization is defined by the at least second rule.

15. The method of claim 12 further comprising:
requesting the report based on the at least first rule by through a client system that is coupled to a server system over the Internet.

16. The method of claim 12 in which the financial assets comprise short term accounts receivable.

17. A computer program product, stored on a computer readable medium, for managing accounts receivable, the program comprising instructions for causing a computer to:
receive and store information regarding a pool of financial assets;
segregate the financial assets into a first category and a second category according to a first set of abstraction rules that define a hierarchy of the first and second categories of financial assets;
segregate the financial assets contained within a first one of each of the first and second categories into asset classes according to a second set of abstraction rules that define a hierarchy of the asset classes;
abstract information regarding a subgroup of the financial assets within the pool according to at least a first abstraction rule of the first set of abstraction rules, the first abstraction rule defining the subgroup according to user-defined specifications for purchasing financial assets;
summarize the information provide by operation of the first abstraction rule;
provide information regarding individual financial assets within the subgroup of the pool according to at least a second abstraction rule of the first set or the second set of abstraction rules stored electronically on a computer, the second abstraction rule defining at least one of the individual financial assets according to user-defined specifications for purchasing financial assets.

18. The computer program product of claim 17 further which the financial assets comprise accounts receivable.

19. The computer program product of claim 17 further comprising in which the information is received in real time.

20. The computer program product of claim 17 further comprising instructions for causing a computer to abstract information using a hierarchy of abstraction rules to define hierarchical subsets of the pool of financial assets.

21. The computer program product of claim 20 further comprising instructions for causing a computer to represent the hierarchy of abstraction rules as a tree structure defined by the hierarchy of abstraction rules.

22. The computer program product of claim 17 further comprising instructions for causing a computer to produce a report concerning individual financial assets within the subgroup of the pool according to the at least first abstraction rule with producing being constrained by the at least second rule.

23. The computer program product of claim 22 further comprising instructions for causing a computer to provide a report in response to a request from a user based on the at least first rule through a client system that is coupled to a server system over a network.

24. The computer program product of claim 17 further comprising instructions for causing a computer to scan a document related to the financial obligations to produce a scanned image, store the scanned image and display the scanned image to an authorized user, wherein the authorization is defined by the at least second rule.

* * * * *